United States Patent Office 3,574,530
Patented Apr. 13, 1971

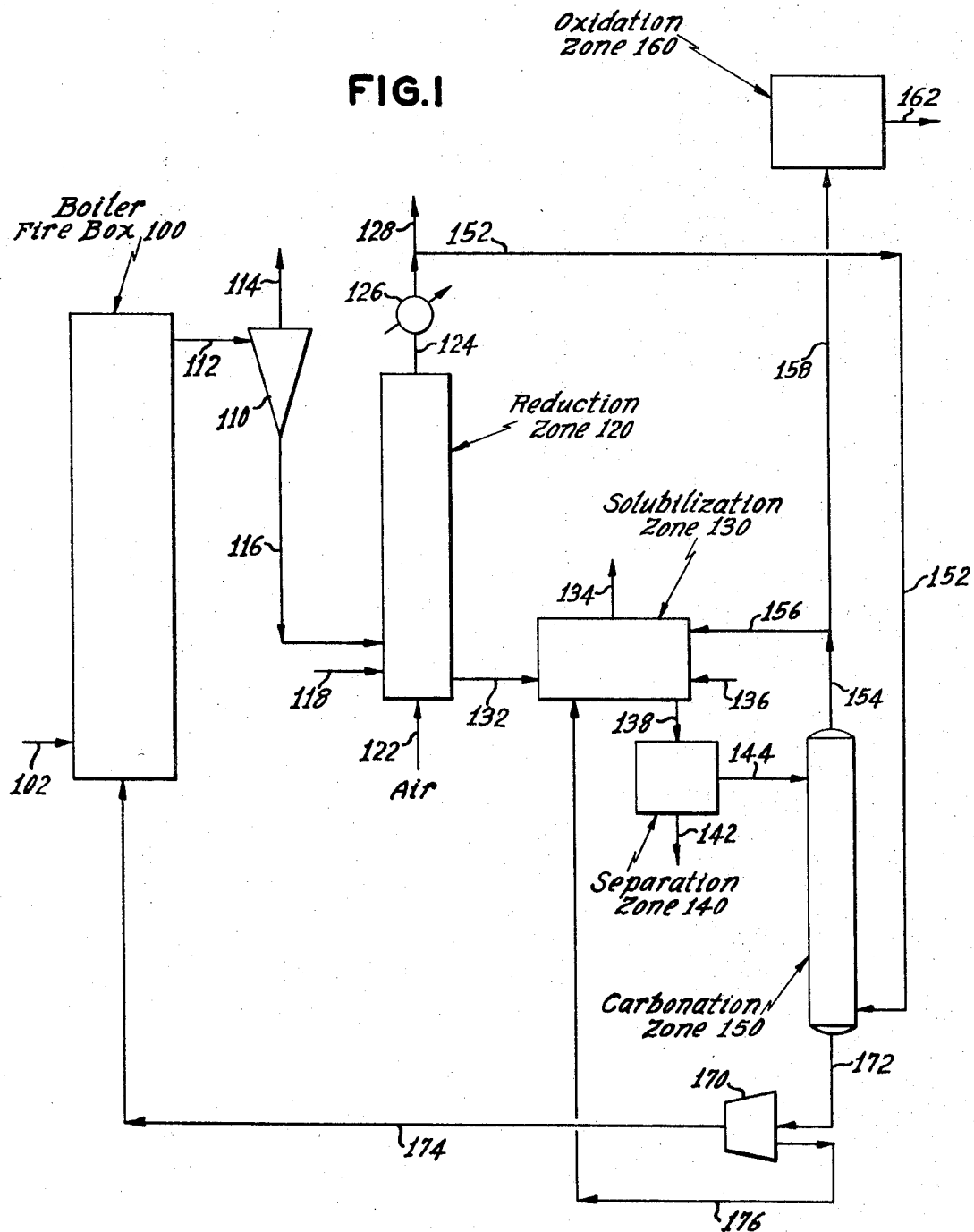

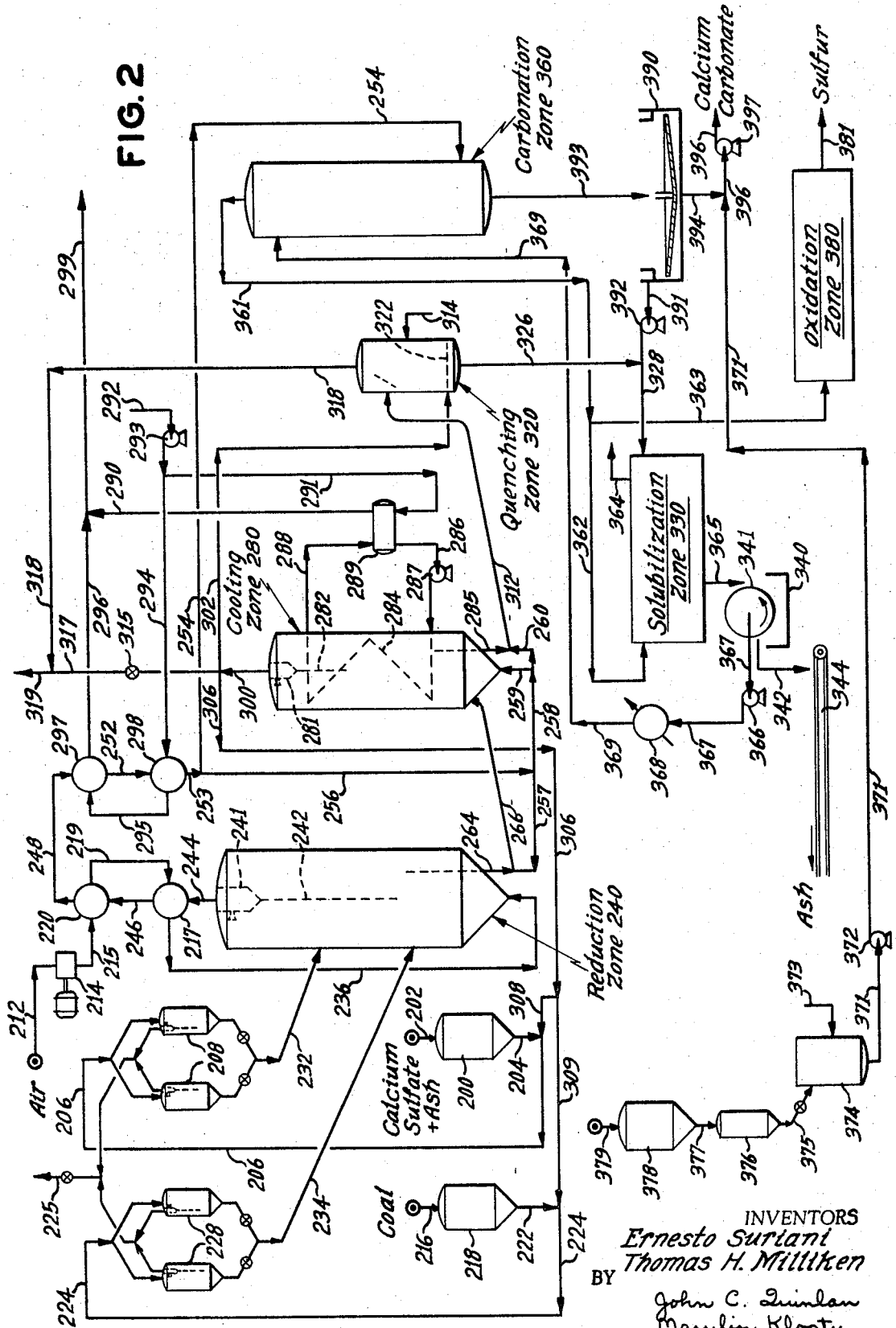

3,574,530
METHOD OF REMOVING SULFUR DIOXIDE FROM WASTE GASES
Ernesto Suriani, Freehold, N.J., and Thomas H. Milliken, New York, N.Y., assignors to Pullman Incorporated, Chicago, Ill.
Filed Oct. 2, 1967, Ser. No. 672,166
Int. Cl. B01d 53/34
U.S. Cl. 23—2                                                24 Claims

ABSTRACT OF THE DISCLOSURE

A process for the conversion of solids containing alkaline earth metal and sulfur values to the corresponding alkaline earth metal carbonate and an enriched hydrogen sulfide-containing gaseous product which includes a multi-stage conversion of alkaline earth metal sulfide to the indicated products. Solids comprising alkaline earth metal sulfide are slurried in an aqueous medium and the resulting slurry is contacted with a gas comprising hydrogen sulfide to produce an aqueous solution of the alkaline earth metal hydrosulfide, any water insoluble impurities originally associated with the metal sulfide remaining suspended in the aqueous medium. The aqueous solution of alkaline earth metal hydrosulfide, after separation of any such impurities, is then contacted with carbon dioxide to produce alkaline earth metal carbonate and an enriched hydrogen sulfide-containing gas, a portion of the latter being used to form the aqueous solution of alkaline earth metal hydrosulfide, and the remaining portion being converted to elemental sulfur or sulfur dioxide. The solids comprising alkaline earth metal sulfide may be derived by reduction of alkaline earth metal sulfate including native and byproduct sulfate such as gypsum, and alkaline earth metal sulfate produced by treatment of sulfur dioxide-containing gases or sulfate-containing waters with alkaline earth metal carbonate or oxide.

---

This invention relates to a particular process for recovering the sulfur content of low valued sulfur-bearing materials. In one aspect the invention relates to an improved method for recovering the respective alkaline earth metal and sulfur values of alkaline earth metal sulfides, as alkaline earth metal carbonate in substantially pure form and gaseous product relatively rich in hydrogen sulfide. In another aspect the present invention relates to a process comprising a particular combination of steps for recovering sulfur from sulfur-bearing materials which as such are of very little commercial value such as gypsum, or which are actually detrimental from the standpoint of public health in that they cause an air or water pollution problem such as waste gases containing sulfur dioxide and sulfate-containing waste waters.

Notwithstanding the tight supply of sulfur large quantities of which are of course consumed in the manufacture of sulfuric acid and other important industrial chemicals, millions of tons of sulfur are lost to the chemical industry each year in the form of waste products. For example, in the manufacture of phosphoric acid by the wet process which involves acidulation of phosphate rock with sulfuric acid, the chief byproduct is calcium sulfate, commonly referred to as gypsum, which as such is of little industrial value and in most cases causes a disposal problem. Sulfur value is also wasted by the discharge into the atmosphere of flue and stack gases containing sulfur oxides, particularly sulfur dioxide, which are exhausted from many industrial operations such as the smelting of sulfur-containing ores, the manufacture of sulfuric acid, petroleum refining and by steam-electric power stations. Not only is the discharge of such gases into the atmosphere a waste of a valuable chemical but such gases have a damaging effect on human beings, animals, agricultural areas and in general are one of the major causes of the air pollution problem. Other sulfur-bearing materials which are of little use and cause a disposal and water pollution problem are sulfate-containing waters such as spent pickling liquors and ore extraction media based on the use of sulfuric acid. Manifestly there is an existing need for a practical and economical method for recovering sulfur from the aforesaid gaseous, solid and liquid waste materials which method serves the two-fold purpose of alleviating the shortage of sulfur derived from natural resources, and of overcoming the serious disposal and pollution problems caused thereby.

Insofar as the recovery of the sulfur content of gypsum is concerned, it is known that native gypsum has been used to a limited extent in Europe, particularly in Great Britain and Germany, as a raw material for the manufacture of sulfuric acid. For example, gypsum and a carbonaceous reductant such as coal when heated to a temperature of about 1200° C., provide sulfur dioxide and solid byproduct comprising calcium oxide or lime in association with impurities derived from both the gypsum and coal reductant. In applying this method to byproduct gypsum formed in the manufacture of wet process phosphoric acid, the solid product comprising lime is an even less satisfactory product since it is in association with a relatively large quantity of solid impurities carried over from the gypsum and derived from the phosphate rock ore which is acidulated with sulfuric acid. In order to provide a salable byproduct, the reaction of gypsum and coal has also been carried out in the presence of added acidic oxides such as silica to produce cement. One disadvantage of this latter reaction, however, is that it must be carried out at a high temperature of about 1450° C. in order to provide a cement of sufficient strength. Another disadvantage of these prior art methods is that the sulfur is recovered only as sulfur dioxide and, in view of the fact that this gas is corrosive, toxic and expensive to transport, a sulfuric acid manufacturing plant is usually a necessary adjunct at the site of the gypsum processing plant. Still a further disadvantage is that, although the sulfur dioxide-containing effluent of such processes may be used for the manufacture of sulfuric acid, the effluent stream is relatively dilute and thus the cost of the sulfuric acid produced therefrom is correspondingly higher than if the effluent gas were more concentrated in sulfur dioxide. There is a need therefore for a process which is capable of recovering sulfur from either native or byproduct gypsum, in a form which can be converted either to elemental sulfur or an effluent gas relatively rich in sulfur dioxide, and which at the same time allows for the isolation of the calcium value as a substantially pure product which can be used for the manufacture of high quality cement, if desired, or for any other industrial application depending upon the use of high purity calcite.

Insofar as the recovery of sulfur from waste gases is concerned, a great deal of research effort is being expended in order to abate the sulfur dioxide air pollution nuisance. A number of approaches have been taken. One is to use fuels low in sulfur content but such fuels are generally regarded as too expensive for widespread use. A second approach is to treat the gases by chemical means to render the sulfur dioxide innocuous either by adsorption or chemical conversion to another form. Such methods which are reported in the prior art are usually classified as wet processes, dry processes or methods involving catalytic oxidation of the gas itself. Wet methods comprise scrubbing the gases with aqueous solutions such as an aqueous slurry of lime or lime stone, ammonia solutions, aqueous sodium sulfite or organic liquids such as certain types of organic acids and alcohols. Even though some of these wet methods lead to recovery of sulfur as ammonium sulfate or sulfuric acid, they have the common drawback of adversely affecting the normal buoyancy of the stack plume due to the fact that the gases are cooled during the scrubbing process. Loss of buoyancy tends to aggravate the pollution problem since a decrease in the normal stack draught allows more polluted gas to reach ground level. In order to restore the normal buoyancy or stack draught, provision may be made to reheat the stack gases but this entails large heat input and, from the latter standpoint, wet techniques are unattractive. Catalytic oxidation methods involve contacting the stack gas with an oxidation catalyst such as vanadium pentoxide to convert the sulfur dioxide to sulfur trioxide which is then passed to a sulfuric acid plant, or in accordance with one modification, the trioxide is treated with ammonia to form ammonium sulfate. Prior to being passed over the catalyst, the stack gas must be treated to remove solid particles such as dust, grime and fly ash in order to prevent clogging of the catalyst bed and to minimize contamination of the sulfuric acid product. Drawbacks of this type of process are that the gas which is passed to the sulfuric acid plant is relatively dilute thereby requiring correspondingly increased facilities to handle the huge volume of gas, and the sulfuric acid product is contaminated with ash. The alternative ammonium sulfate product, although readily transported, is decreasing in commercial value because of oversupply.

The so-called dry methods for treating waste gases comprising sulfur dioxide include those often referred to in the art as the Reinluft Process, the Alkalized Alumina Process and the Wickert Process. In the first of these, a bed of activated char as adsorbent is moved downwardly within the adsorption zone as the stack gas rises therein such that sulfur trioxide is adsorbed in the lower section. The remaining gas is drawn off, cooled and returned to the upper section of the adsorber where sulfur dioxide is oxidized to sulfur trioxide which together with water is then adsorbed on the char to form sulfuric acid. The char containing the sulfuric acid is then passed to a regeneration zone wherein the acid is converted by heat to sulfur trioxide and water, the trioxide is reacted with the carbon of the char to form carbon dioxide and sulfur dioxide, and the gas is passed as feed to a sulfuric acid plant. Methods of this type which depend upon the use of an adsorbent have a number of technical problems associated therewith with respect to the efficiency of the adsorption step, the effectiveness of the desorption step, the problems associated with the regeneration of the adsorbent to maintain its usefulness, and usually require provision of rather complex gas-solid separation equipment to remove solid contaminants from the stack gas to minimize their carry over into the final product whether it be sulfuric acid, ammonium sulfate or elemental sulfur. Similar problems are associated with the Alkalized Alumina Process in which flue gas containing sulfur dioxide is contacted with alkalized alumina as adsorbent which is then regenerated by treatment with hydrogen-containing gas at an elevated temperature to produce hydrogen sulfide.

A third dry method for sulfur dioxide removal from gases is the Wickert Process by which powdered, calcined dolomite is injected into the combustion furnace of power plants to remove the sulfur dioxide as calcium and magnesium sulfates. The sulfates, however, are contaminated with soot and ash and, since this mixture has no industrial use it is simply discarded as waste. Thus, although the Wickert Process may reduce the sulfur dioxide contaminant of the gas discharged to the atmosphere down to tolerable levels, it is not a sulfur recovery process and the waste mixture of calcium and magnesium sulfates only causes a disposal problem. It is further noted that Beckman U.S. Pat. No. 2,718,453 discloses the injection of powdered calcium carbonate into the sulfur dioxide combustion gas to form calcium sulfate but, as in the case of the Wickert Process, the byproduct comprising calcium sulfate is of little industrial value being associated with substantial amounts of soot and fly ash.

Water pollution caused by industrial sulfur-bearing waste products is also a serious problem to which considerable attention is being given. For example, sulfuric acid is used by the steel industry as a pickling liquor and eventually it becomes necessary to dispose of the spent acidic liquor which also contains ferrous sulfate. Although the spent liquor can be temporarily disposed of in deep wells, it gradually seeps into the ground, drains into waterways and causes a pollution problem. Water pollution is also caused by the dumping of spent sulfuric acid media employed in the extraction of ores such as ilmenite ore. Also contributing to the water pollution problem are run-off waters from mines containing iron sulfide or other pyrites, sulfide undergoing bacterial and/or chemical oxidation to sulfate contaminant. Although lime has been used as a water neutralizer to form calcium sulfate, the sulfate salt is simply dumped as waste. Aside from the serious pollution problem caused by these various sulfate-containing waters, the mere disposal thereof or of their neutralization products, is a waste of an otherwise valuable chemical, sulfur.

It is therefore an object of this invention to provide a particular and improved method for the recovery of sulfur from low valued sulfur-bearing materials.

Another object is to provide an improved method for converting an alkaline earth metal sulfide to alkaline earth metal carbonate and hydrogen sulfide.

Another object is to provide a particular method for the recovery of sulfur from alkaline earth metal sulfates which method allows for the recovery of the alkaline earth metal value in a substantially pure form.

Another object is to provide a method for processing alkaline earth metal sulfates in association with water insoluble impurities which method leads to the conversion of the sulfur content to a more valuable and useful form and which allows for the production of an alkaline earth metal compound free of said impurities.

Another object is to provide a particular process for the treatment of gypsum including native deposits and byproduct gypsum produced, for example, in the wet process for manufacturing phosphoric acid, whereby calcium value is recovered as calcium carbonate which is free of solid impurities associated with the native or byproduct gypsum and the sulfur value is recovered as hydrogen sulfide-enriched gaseous product especially suitable for conversion to elemental sulfur or sulfur dioxide.

A further object is to provide a particular cyclic, regenerative method for the recovery of sulfur from waste gases containing sulfur dioxide and from sulfate-containing waste waters which method is based on the use of alkaline earth metal compounds.

A further object is to provide a method for regenerating calcium carbonate from the calcium sulfate-containing waste produced by methods involving treatment of sulfur dioxide-containing stack gases generated by coal-fired combustion furnaces with calcium carbonate, and such that the regenerated calcium carbonate is free of fly ash, soot and other solid pollutants contained in the stack gases.

Various other objects and advantages of this invention will become apparent from the accompanying description and disclosure.

In accordance with the teachings of this invention, a process is provided for recovering the alkaline earth metal and sulfur values from materials containing the same, the process including a two-stage method for converting an alkaline earth metal sulfide to alkaline earth metal carbonate and hydrogen sulfide, the first stage comprising contacting the alkaline earth metal sulfide in an aqueous medium with hydrogen sulfide to form an aqueous solution of the corresponding alkaline earth metal hydrosulfide and the second stage comprising contacting the aqueous solution of the alkaline earth metal hydrosulfide thus formed with carbon dioxide to form the corresponding alkaline earth metal carbonate and hydrogen sulfide, a portion of the hydrogen sulfide so produced being passed to the first stage as the hydrogen sulfide feed thereto. The remaining portion of the hydrogen sulfide may then be subjected to conditions such that the sulfur content is converted to a higher oxidation state and recovered as elemental sulfur or sulfur dioxide. The aforesaid first stage is referred to herein as the solubilization reaction and the second stage as the carbonation reaction. Each of the solubilization and carbonation reactions is carried out in an aqueous medium and under temperature and pressure conditions such that the aqueous medium is maintained in the liquid phase. The reactions which occur during the solubilization and carbonation steps are expressed by the following Equations 1 and 2, respectively:

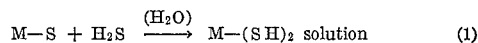

(1)

$$M-(SH)_2 + H_2O + CO_2 \rightarrow M-CO_3 + 2H_2S \qquad (2)$$

wherein M is an alkaline earth metal which term as used herein including the appended claims, is defined as a metal of Group II–A of the Periodic Table having an atomic number from 20 to 56, that is, at least one member of the group consisting of calcium, strontium and barium.

A number of advantages are realized by effecting the conversion of the alkaline earth metal sulfide to carbonate in two stages as described herein, in contrast to effecting the conversion according to the one step reaction expressed by the following Equation 3 in which calcium is the alkaline earth metal:

$$CaS + H_2O + CO_2 \rightarrow CaCO_3 + H_2S \qquad (3)$$

In effecting the reaction of Equation 3, the calcium value of the reactant and product remains in the same phase, that is, suspended in the aqueous medium, due to the fact that both the calcium sulfide reactant and calcium carbonate product are substantially water insoluble. In accordance with the direct conversion of calcium sulfide to calcium carbonate, therefore, any impurities in association with the calcium sulfide and which are also water insoluble, cannot be separated and are carried over into the carbonate product. In accordance with the two-stage conversion of this invention, on the other hand, the alkaline earth metal value of the sulfide reactant of Equation 1 above, is converted from a water insoluble to a water soluble form, i.e., alkaline earth metal hydrosulfide, and is thus effectively brought into a different phase from any water insoluble impurities in association with the sulfide reactant. Such impurities can now be readily separated from the aqueous solution of hydrosulfide prior to converting the latter to carbonate. Thus, when the alkaline earth metal sulfide is in association with such impurities, the nature of which depends upon the source of the metal sulfide as discussed in greater detail below, and it is desired to recover the corresponding alkaline earth metal carbonate in substantially pure form, the aqueous medium withdrawn from the zone in which the solubilization reaction is carried out, is passed to a liquid-solids separation zone wherein such impurities are separated from the aqueous solution of alkaline earth metal hydrosulfide, prior to passage of the latter solution to the carbonation reaction zone. It is evident therefore that one advantage of the method of this invention is that alkaline earth metal value may be recovered from alkaline earth metal sulfide in substantially pure form, i.e., free of any water insoluble impurities in association with the alkaline earth metal sulfide and free of any unconverted metal sulfide reactant.

A second important advantage of the presently described two-stage conversion is that, as shown by the carbonation reaction of Equation 2 above, two moles of hydrogen sulfide are generated per mole of carbon dioxide consumed, in contrast to the equimolar relationship of the reaction of Equation 3. As will become apparent from the more detailed discussion of the process of this invention, this is a particularly significant advantage from the standpoint of further utilization and processing of that portion of the hydrogen sulfide gaseous effluent withdrawn from the carbonation reaction zone which is not passed to the solubilization reaction zone, to recover the sulfur content in a more valuable form such as elemental sulfur or sulfur dioxide for use in the manufacture of sulfuric acid.

In accordance with a more specific embodiment of the process of this invention, the above-described two-stage reaction is operated in combination with a preceding reaction, referred to herein as the reduction reaction, which comprises contacting a solid material containing an alkaline earth metal surfate with a reductant under conditions such that the sulfate is converted to the corresponding alkaline earth metal sulfide which is then passed as feed to the solubilization reaction of Equation 1 above, and is recovered as alkaline earth metal carbonate from the carbonation reaction of Equation 2. In accordance with this embodiment, the process of the present invention is applied with particular advantage to materials comprising alkaline earth metal sulfates in association with impurities which materials are of little value as such or are ordinarily disposed of as waste, in that in addition to the recovery of the sulfur content as hydrogen sulfide, the present process allows for the isolation of the alkaline earth metal value as substantially pure alkaline earth metal carbonate. Among such alkaline earth metal sulfate-bearing materials which are advantageously processed as described herein, are naturally occurring ores such as native calcium sulfate (gypsum), native strontium sulfate (celestine) and native barium sulfate (barytes) which ordinarily are associated with impurities such as silica, iron oxides and alumina. In addition to native ores, the alkaline earth metal sulfate may be that produced synthetically by any one of a number of processes in which the sulfate is presently a waste product or byproduct. For example, in the well-known wet process for manufacturing phosphoric acid by acidulation of phosphate rock with sulfuric acid, calcium sulfate is produced and is contaminated with such materials as silica, calcium fluoride, calcium phosphate, alumina and iron compounds in amounts which can be as high as 15–30 weight percent. As such, this by-product gypsum is of little industrial value and is ordinarily sent to waste disposal. In accordance with this particular embodiment of the present invention, one of the aforesaid materials containing alkaline earth metal sulfate in association with inorganic impurities of the aforesaid type, is contacted with a reductant under conditions such that sulfate is converted to the corresponding sulfide, the solid product of the reduction reaction then being subjected to the aforesaid solubilization-carbonation reactions of Equations 1 and 2 above, the said impurities being separated from the solution of the alkaline earth metal hydrosulfide prior to passage of the latter to the carbonation reaction. In this manner, the calcium value of native or byproduct gypsum, for example, is recoverable as substantially pure calcium carbonate which is a valuable industrial product useful, for example, in the manufacture of soda ash (sodium carbonate) and cement, in the paper industry as a paper brightener, as a soil and liquid waste neutralizer and for water purification. The other alkaline earth metal carbonates which are also produced from their corresponding sulfates in substantially pure form by the method of this invention, are similarly useful for soil and liquid waste neutralization and water purification.

Another class of sulfate-bearing materials which are advantageously processed by this invention are alkaline earth metal sulfates produced by methods which depend upon the use of alkaline earth metal carbonates or oxides. One such method is the commercial process for clarification of water contaminated with water soluble sulfates, known as the lime process, by which the water is treated with calcium oxide or calcium carbonate to form precipitated product comprising calcium sulfate. For example, spent sulfuric acid pickling liquors employed in the steel industry contain sulfuric acid and substantial amounts of iron sulfates. Upon treatment of such liquors with lime, sulfate is precipitated as calcium sulfate together with iron oxides which mixture of solids is presently discarded as waste but is a suitable feed to the reduction reaction of the process of this invention. In this connection it is noted that, although barium carbonate or oxide is a more effective scavenger of sulfate anions since more complete removal thereof from the aqueous medium to be purified is achieved in view of the lower water solubility of barium sulfate, in practice barium compounds are not employed because of their high cost. In view of the fact that the application of the present method to such waste alkaline earth metal sulfates provides for the regeneration of the alkaline earth metal carbonate or oxide precipitant, any of the alkaline earth metal carbonates or oxides may be used as the water purifier in commercial practice.

Another method which leads to the production of waste calcium sulfate and which depends upon the use of calcium carbonate as feed thereto is the aforementioned Wickert Process which comprises injecting calcium carbonate into the sulfur dioxide-containing gases generated for example, in oil- or coal-fired combustion furnaces of steam generating plants. Such gases are associated with ash, commonly referred to as fly ash, which is derived from the oil or coal burned in the combustion furnace. The calcium sulfate product of this type of process is contaminated with ash as well as soot, dirt and the like and, although it is presently discarded as waste, it too is advantageously processed as described herein to isolate the calcium value as substantially pure calcium carbonate for reuse in the treatment of the sulfur dioxide-containing gases.

In accordance with a still more specific embodiment of the process of this invention, therefore, a cyclic, regenerative method is provided which comprises contacting, in a first reaction zone, an alkaline earth metal compound selected from the group consisting of an alkaline earth metal carbonate, an alkaline earth metal oxide and mixtures thereof, with a sulfur-bearing material selected from the group consisting of gases comprising sulfur dioxide and aqueous media having sulfate anions dissolved therein, under conditions such that solids comprising the corresponding alkaline earth metal sulfate in association with impurities derived from the said gases or aqueous media is produced, passing said solids to a reduction zone wherein the solids are subjected to a reducing environment under conditions such that alkaline earth metal sulfate is converted to the corresponding sulfide, the sulfide being in association with said impurities, passing solids comprising said sulfide together with said impurtes to a solublization reaction zone wherein the solids are slurried in water and the resulting slurry is contacted with hydrogen sulfide to produce an aqueous solution of alkaline earth metal hydrosulfide having water insoluble solids comprising impurities suspended therein, passing said aqueous medium to a separation zone in which said solids comprising impurities are separated, passing the clarified aqueous medium having alkaline earth metal hydrosulfide dissolved therein from said separation zone to a carbonation rection zone wherein the aqueous solution of alkaline earth metal hydrosulfide is contacted with carbon dioxide to form hydrogen sulfide and alkaline earth metal carbonate substantially free of water insoluble impurities, passing said alkaline earth metal carbonate either as such or in the form of its oxidic thermal decomposition product to said first reaction zone for re-utilization therein, and passing a portion of the hydrogen sulfide produced in said carbonation reaction zone to said solubilization reaction zone as the hydrogen sulfide feed thereto.

In the reduction step of the process of this invention, solids comprising alkaline earth metal sulfate, derived from any one of the aforesaid sources, are contacted in a reduction zone with a reductant under conditions including a temperature between about 1200° F. and about 2000° F. such that sulfate is converted to the corresponding metal sulfide. The reductant may be normally gaseous, liquid or solid. Suitable reductants include hydrogen, hydrogen suifide, carbon monoxide, hydrocarbons and solid carbonaceous materials, which may be employed individually or in combination with one another. Typical examples of suitable solid carbonaceous materials which may be employed are: coal of various grades, for example, anthracite, semi-anthracite, bituminous, semi- and sub-bituminous, brown coal, cannel coal, peat coal and lignitic coal; charred coal; coke of various grades including petroleum coke and coal coke; peat; graphite; lignite; and any combination thereof. Normally liquid reductants are usually hydrocarbonaceous and include oils having a relatively low boiling chracteristic such as light naphtha, gasoline and kerosene, to those having a high boiling characteristic such as crude oil and tar, including intermediate boiling range liquids such as heavy naphtha and gas oil. Normally gaseous reductants which may be employed are exemplified by: carbon monoxide, hydrogen, hydrogen sulfide, normally gaseous hydrocarbons including any one of the $C_1$ to $C_4$ paraffins, natural gas and unsaturated hydrocarbons such as, for example, ethylene and propylene. It is to be understood that the aforesaid normally gaseous reductants may be used individually, in combination with one another or with diluents such as carbon dioxide, or in combination with the aforesaid normally solid and liquid reductants.

When gases comprising hydrogen, carbon monoxide, or mixtures thereof are used as reductant, they may be added to the reduction zone as such from an external source or they may be formed within the reduction zone. Thus, such reducing gases may be generated by the steam reforming of natural gas or other feeds comprising hydrocarbons to produce hydrogen and carbon oxides, or by the gasification of the aforesaid solid carbonaceous materials such as coal with carbon dioxide to provide carbon monoxide or with steam to provide gas comprising hydrogen and carbon oxides. Although such hydrogen and carbon monoxide producing reactions may be carried out in a separate steam reforming or gasification zone operated in combination with the reduction zone, they may also be carried out within the reduction zone to generate the reducing gas in situ, the temperatures required therefor (e.g., from about 1400° F. to about 2000° F.) being within the range at which the reduction of alkaline earth metal suulfate to sulfide occurs. Accordingly, it is within the scope of this invention to introduce to the reduction zone: solids comprising alkaline earth metal sulfate; steam, carbon dioxide or mixtures thereof; and natural gas, hydrocarbons or solid carbonaceous materials, such that at least a portion of the latter type reactant is converted within the reduction zone to a gaseous reducing environment comprising hydrogen and/or carbon monoxide.

Prior to use in the reduction step of the process of this invention, the reductant need not be treated to separate contaminants ordinarily associated therewith such as coal ash, sulfur, heavy metal contaminants, sand, etc. Such contaminants do not interfere with the reduction reaction itself and, since provision is made in a later stage of the process for their ready removal together with any solid impurities contained in the alkaline earth metal sulfate, they do not interfere with the subsequent isolation of alkaline earth metal value as substantially pure carbonate.

Although the foresaid reductants convert sulfate to sulfide, the nature of the second product of the reduction reaction depends upon the particular reductant employed. For example, when one of the aforesaid solid carbonaceous materials is employed as reductant, the second product of the reduction is carbon dioxide as illustrated by the following equation:

$$M-SO_4+2C \rightarrow M-S+2CO_2 \quad (4)$$

wherein "M" is any of the alkaline earth metals as defined above and "C" is used to represent any one of the aforesaid solid carbonaceous materials. When a hydrocarbon reductant is employed, the reaction proceeds with generation of steam and carbon dioxide as shown by the following equation wherein methane is used as illustrative of any one of the aforesaid normally gaseous or liquid hydrocarbons:

$$M-SO_4+CH_4 \rightarrow M-S+2H_2O+CO_2 \quad (5)$$

When the reduction reaction is effected in the presence of hydrogen or a gas comprising hydrogen and carbon monoxide as reductant, the reactions also proceed with formation of steam as shown by the following equations, respectively:

$$M-SO_4+4H_2 \rightarrow M-S+4H_2O \quad (6)$$

$$M-SO_4+3H_2+CO \rightarrow M-S+CO_2+3H_2O \quad (7)$$

As noted above, the reductant also may be hydrogen sulfide either alone or in combination with another reductant such as a solid carbonaceous material or hydrogen in which event the reduction reactions proceed as follows, respectively:

$$M-SO_4+4H_2S \rightarrow M-S+4S+4H_2O \quad (8)$$

$$M-SO_4+H_2S+1\tfrac{1}{2}C \rightarrow M-S+1\tfrac{1}{2}CO_2+H_2O+S \quad (9)$$

$$M-SO_4+H_2S+3H_2 \rightarrow M-S+4H_2O+S \quad (10)$$

$$M-SO_4+H_2S+H_2 \rightarrow M-S+2H_2O+SO_2 \quad (11)$$

From the standpoint of the reduction reaction itself, the relative proportion of reductant to alkaline earth metal sulfate is at least sufficient to satisfy the stoichiometric requirements of the above reactions, although usually the reductant when functioning as such is present in excess such as up to a 100 mol percent excess above the stoichiometric requirements. As shown by Equations 4, 5, 7 and 9 above, when the reductant comprises carbon, carbon dioxide is produced. Accordingly, when the alkaline earth metal sulfate reactant is derived from a process in which an alkaline earth metal carbonate is employed such as in the treatment of sulfur dioxide-containing gases, a continuous, cyclic and regenerative process is provided by the employment of a reductant comprising carbon in either elemental or combined form in order to provide the carbon dioxide required for formation of the alkaline earth metal carbonate in the subsequent carbonation reaction. To this latter end as well as when it is desired to recover the carbonate as such for some other industrial use, the reductant comprises carbon, that is, the reductant comprises one of the aforesaid solid carbonaceous materials, carbon monoxide or hydrocarbons and, of the latter, hydrocarbonaceous materials containing an average mole ratio of carbon: hydrogen of from about 99:1 to about 1:4 are preferred.

In general and as stated above, the reduction reaction is carried out at a temperature between about 1200° F. and about 2000° F. It is undesirable to operate above the maximum of 2000° F. since at such excessively high temperatures, the alkaline earth metal sulfate tends to undergo thermal decomposition to the corresponding alkaline earth metal oxide and sulfur dioxide. The preferred temperature employed within the above range depends largely on the nature of the reductant. For example, when the reductant is one of the aforesaid solid carbonaceous materials such as coal, the temperature of reduction is usually maintained between about 1600° F. and about 2000° F. When the reductant comprises one of the aforesaid normally gaseous or liquid reductants, lower temperatures are suitable such as between about 1300° F. and about 1900° F. The reduction reaction may be carried out over a wide pressure range including any subatmospheric pressure to elevated pressures such as up to about 100 pounds per square inch absolute (p.s.i.a.). The reaction is usually carried out at a pressure from substantially atmospheric pressure to an elevated pressure up to about 50 p.s.i.a.

When the reduction reaction is endothermic, it is required that the necessary heat of reaction be supplied to the reduction zone. This may be accomplished by introducing an oxygen-containing gas to the reduction zone and burning a portion of the reductant with generation of heat. Although essentially pure oxygen is suitable for this purpose, the use thereof unnecessarily adds to the cost of the overall process and thus air is usually used. When heat is required to maintain the reduction reaction temperature within the aforesaid range, it may also be supplied by heat exchanger tubes in the reaction zone or by electrical means such as heating elements or a voltaic arc. By the aforesaid means of generating heat, the heat required for the generation of reducing gases by effecting the above-described steam reforming and gasification reactions within the reduction zone is also supplied.

The reduction reaction is carried out in an environment which is less than completely anhydrous, that is, in the presence of at least a trace amount of water vapor or steam, which may be added to the reduction zone as such or supplied simply by vaporization of the moisture content which may be in association with the reductant or solids comprising alkaline earth metal sulfate which are fed to the reduction zone. In addition, when a portion of the reductant is burned with air as described above, steam may be furnished by the water vapor content of atmospheric air. An enhanced reaction rate is observed when the reduction is effected in the presence of reducing gases such as those comprising hydrogen and/or carbon monoxide. Thus, when the initial reactant is of a relatively high carbon content such as one of the aforesaid hydrocarbonaceous or solid carbonaceous materials, the reaction rate is enhanced by using such materials in combination with added steam or carbon dioxide to generate reducing gas containing hydrogen and/or carbon monoxide.

The reduction reaction may be carried out in a variety of reactors such as a rotary kiln, moving or fluidized bed reactors; or in a flow-through system comprising one or more transfer tubes. In the latter type system which is less dense than a fluidized system, the reductant and solids comprising sulfate are passed through transfer tubes at a high velocity (the solids and gases being separated by means of cyclones) and, since the residence time in the tubes is relatively short, the reaction rate is preferably enhanced as described above.

To facilitate further description of the process of this invention, reference is had to FIG. 1 of the accompanying drawings which illustrates in combination reduction zone 120, solubilization zone 130 and carbonation zone 150. Solids comprising alkaline earth metal sulfate are fed to the reduction zone by means of line 116. Although the nature and source of the sulfate may be any one of those discussed above, in accordance with the embodiment of FIG. 1 the solids which are fed to reduction zone 120 comprise alkaline earth metal sulfate in admixture with fly ash derived from boiler fire box 100. The latter is of the type employed in steam-electric power stations and in which the usual fuel is sulfur-containing oil or coal which is fed thereto via line 102. The oil or coal is burned with air (fed to zone 100 by means of a line not shown), the combustion reaction within the boiler fire box generating flue gas comprising sulfur dioxide, carbon dioxide, residual air or nitrogen, etc., and having solid particles of ash, soot, dirt and the like, suspended therein. The solid particles which are referred to collectively as fly ash, are derived from the fuel which is burned within the fire box, the usual components of the ash being silica, alumina and iron oxides, and are carried along in the flue gas as the latter rises at a high velocity within the boiler. Prior to eventual discharge of the flue gas to the atmosphere, the sulfur dioxide content thereof is reduced to tolerable levels of the order of about 5–10 parts per million (p.p.m.) by bringing the gas, while at a temperature within the range of between about 2500° F. and about 1000° F. into contact with alkaline earth metal carbonate or oxide which is fed to boiler fire box 100 by means of line 174. The carbonate or oxide is injected into the fire box as finely divided particles having a particle size of from about 40 microns to about 1 micron, either in dry form or suspended in water and injected as a spray. Within the aforesaid temperature range, the sulfur dioxide reacts with the carbonate or oxide in the presence of the residual oxygen in the flue gas to form the corresponding alkaline earth metal sulfate in association with fly ash, the reactions proceeding according to the following equations, respectively:

$$M-CO_3 + SO_2(\text{fly ash}) + \tfrac{1}{2}O_2 \rightarrow M-SO_4(\text{fly ash}) + CO_2 \quad (12)$$

$$M-O + SO_2(\text{fly ash}) + \tfrac{1}{2}O_2 \rightarrow M-SO_4(\text{fly ash}) \quad (13)$$

wherein "M" is an alkaline earth metal as above defined.

The flue gas having solids comprising alkaline earth metal sulfate, fly ash and any unconverted carbonate or oxide entrained therein, is withdrawn from fire box 100 by means of line 112 and is passed through gas-solids separation zone 110 which may comprise cyclones or an electrostatic preciptator. Within zone 110, the gas and solids are separated and the flue gas which is now substantially free of the sulfur dioxide pollutant, is discharged to the atmosphere by means of line 114.

The solids comprising alkaline earth metal sulfate and fly ash are withdrawn from zone 110 by means of line 116 and are passed to reduction zone 120. In accordance with the embodiment illustrated by FIG. 1, atmospheric air having a water vapor content of about 4 volume percent and one of the aforesaid solid carbonaceous materials such as coal containing about 3 weight percent moisture, are also fed to the reduction zone by means of lines 122 and 118, respectively. The alkaline earth metal sulfate-fly ash mixture and the solid reductant may also be fed to the reduction zone in admixture rather than as separate feeds without departing from the scope of this invention. In using coal, the reduction reaction is preferably carried out at a temperature between about 1600° F. and about 2000° F. It is to be understood that specific heat may be supplied to the reductant, alkaline earth metal sulfate-fly ash solids and air prior to their introduction to the reduction zone by passing them through respective preheat zones in which they are brought to preheat temperatures of between about 1500° F. and about 2000° F. The heat required for the endothermic reduction reaction is supplied by burning a portion of the solid carbonaceous feed with the air introduced by means of line 122. Accordingly, the reductant is fed to the reduction zone in an amount not only at least sufficient to satisfy the stoichiometric requirements of Equation 4 above, i.e., at least two moles of carbon per mole of alkaline earth metal sulfate, but an additional amount is introduced to support the combustion reaction which, for the purpose of illustration, is a 50 mol percent excess, i.e., a total amount of reductant equivalent to three moles of carbon per mole of sulfate. The overall reaction of the indicated reduction and combustion reactions which take place within the reduction zone is expressed by the following equation in which the nitrogen is, of course, derived from the air feed:

$$M-SO_4(\text{fly ash}) + 3C + O_2 + 4N_2 \rightarrow M-S(\text{fly ash}) + 3CO_2 + 4N_2 \quad (14)$$

The hot solids comprising the alkaline earth metal sulfide product of reduction, fly ash originally associated with the sulfate, ash derived from the coal reductant, and any unconverted reductant and sulfate, are withdrawn from the reduction zone by means of line 132 and are passed to solubilization zone 130.

Hot gaseous effluent comprising carbon dioxide and nitrogen in a mole ratio of 3:4 is withdrawn from the reduction zone by means of line 124 and, as shown, is cooled by being passed through cooler 126. At least a portion of the cooled effluent is then sent to carbonation zone 150 by means of line 152. Any remaining portion of the cooled gaseous effluent may then be vented to the atmosphere by means of line 128. It is to be understood that, prior to being passed to carbonation zone 150 and solubilization zone 130, the heat contained in the respective effluents comprising carbon dioxide and solids which are withdrawn from the reduction zone by means of lines 124 and 132, respectively, may be utilized to bring the reductant, solids comprising sulfate and air to a preheat temperature within the aforesaid range prior to their introduction to reduction zone 120.

Within solubilization reaction zone 130, the solids comprising alkaline earth metal sulfide and impurities which include fly ash, coal ash and any unconverted reductant and alkaline earth metal sulfate, are slurried in water introduced from line 176 with addition of any required make-up water by means of line 136. Gaseous feed comprising hydrogen sulfide derived from carbonation zone 150 and flowing through line 156 is also feed to solubilization zone 130 such that it is passed through the aqueous slurry contained therein. The chemical reaction which takes place within solubilization zone 130 is expressed by Equation 1 above, and comprises conversion of the water insoluble alkaline earth metal sulfide to water soluble alkaline earth metal hydrosulfide, the latter going into solution such that the aforesaid impurities remain suspended in the solution. As already noted, the solubilization reaction is carried out under temperature and pressure conditions such that the aqueous reaction medium is maintained in the liquid phase. Accordingly, the aqueous solubilzaiton reaction medium is maintained at a temperature of between about 70° F. and about 200° F. and under a total pressure from about substantially atmospheric pressure to elevated pressure such as, for example, to about 50 p.s.i.a. Within these conditions, it is preferred to maintain the aqueous medium at a temperature from about 70° F. to about 160° F. and under a partial pressure of hydrogen sulfide of at least 10 percent of the total pressure.

The aqueous medium which is now in the form of a less dense slurry due to the solubilization of alkaline earth metal sulfide as hydrosulfide, is withdrawn from zone 130 and is passed to separation zone 140 via line 138. Within separation zone 140, the aforesaid suspended impurities comprising fly ash, etc., are separated by any suitable liquid-solids separation techniques such as filtration, centrifugation and settling, and are withdrawn therefrom via line 142. The clarified filtrate having the alkaline earth metal hydrosulfide dissolved therein, is withdrawn from separation zone 140 and is passed to carbonation zone 150 by means of line 144.

Within carbonation zone 150, the aqueous solution of alkaline earth metal hydrosulfide is brought into contact with gaseous effluent comprising carbon dioxide and nitrogen withdrawn from reduction zone 120 and passing through line 152. It is preferred that the aqueous and gaseous streams be introduced to the carbonation zone such that the flow of the two streams therein is countercurrent. As illustrated by FIG. 1, this is accomplished, for example, by introducing the aqueous solution to the upper portion of carbonation zone 150 and the gaseous carbon dioxide feed to the lower portion. The reaction within zone 150 proceeds with formation of alkaline earth metal carbonate and hydrogen sulfide as illustrated by Equation 2 above, and is carried out under temperature and pressure conditions such that the aqueous reaction is maintained in the liquid phase. The carbonation zone may be operated at subatmospheric, substantially atmospheric or elevated pressures such as up to about 50 p.s.i.a. The temperature at which the carbonation reaction is carried out is usually at least 120° F. and preferably the reaction is carried out at the boiling point of the solution which at substantially atmospheric pressure is approximately 220° F., the particular boiling point depending of course on the concentration of hydrosulfide dissolved therein. As the aqueous solution of the alkaline earth metal hydrosulfide and gas comprising carbon dioxide are contacted, hydrogen sulfide is produced and the alkaline earth metal value is precipitated as fine particles of alkaline earth metal carbonate which is free of the fly ash originally associated with the alkaline earth metal sulfate produced in boiler fire box 100 and the other impurities derived from the reduction reaction. The aqueous slurry of carbonate is pased via line 172 to zone 170 in which water may be removed in whole or in part. The water which is separated is recycled to solubilization zone 130 via line 176. The alkaline earth metal carbonate is recovered from zone 170 either in substantially dry form or as a concentrated slurry and may be recycled as such or as its thermal decomposition product, the oxide, to boiler fire box 100 by means of line 174.

Gaseous effluent comprising hydrogen sulfide and nitrogen is withdrawn from carbonation zone 150 via line 154 and a portion of the stream is directed through line 156 to solubilization zone 130 as the hydrogen sulfide feed required for the conversion of the alkaline earth metal sulfide to hydrosulfide, the remaining components of the gaseous feed thereto such as nitrogen being vented from zone 130 via line 134. In accordance with the embodiment of FIG. 1, the remaining portion of gaseous effluent withdrawn from carbonation zone 150 is passed into line 158 and is fed to oxidation zone 160 for conversion to either elemental sulfur or sulfur dioxide by well known oxidation reactions. In order to satisfy the hydrogen sulfide requirements of the solubilization reaction effected in zone 130, the gaseous effluent from carbonation zone 150 is usually split into approximately equal portions, one half being passed to zone 130 and the remaining half to oxidation zone 160.

Within oxidation zone 160, the gaseous hydrogen sulfide-nitrogen feed thereto may be converted to sulfur dioxide or elemental sulfur by well known oxidative reactions. For example, within zone 160 the hydrogen sulfide content of the feed thereto may be burned, usually in air, at a temperature of about 1500° F., for example, to produce gaseous effluent containing at least 6–8 mole percent sulfur dioxide recovered by means of line 162 and suitable for use in the manufacture of sulfuric acid. Alternatively, within oxidation zone 160, the hydrogen sulfide may be converted to elemental sulfur by the well known Clause Process. The latter process comprises reacting about one-third of the hydrogen sulfide-containing feed with oxygen, usually supplied as air, at a temperature of about 1500° F. in a first reactor to produce sulfur dioxide which is then reacted in a second reactor to which the remaining two-thirds portion of the hydrogen sulfide-containing feed is also introduced. In the second reactor, the hydrogen sulfide and sulfur dioxide are contacted at a temperature of about 1000° F. to form elemental sulfur and water vapor which is withdrawn from oxidation zone 160 via line 162. This particular multistage method for converting hydrogen sulfide to elemental sulfur depends upon the following reactions which are known to the art:

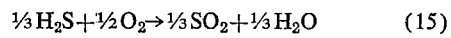

$$\tfrac{1}{3}H_2S + \tfrac{1}{2}O_2 \rightarrow \tfrac{1}{3}SO_2 + \tfrac{1}{3}H_2O \qquad (15)$$

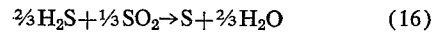

$$\tfrac{2}{3}H_2S + \tfrac{1}{3}SO_2 \rightarrow S + \tfrac{2}{3}H_2O \qquad (16)$$

The gaseous hydrogen sulfide product produced by the method of this invention is especially suited for conversion to sulfur in a higher oxidation state by one of the aforesaid methods, since it is recoverable in a relatively concentrated form. Thus, in accordance with the embodiment described with reference to FIG. 1, which is directed to the use of a solid carbonaceous reductant in a 50 mole percent excess of the amount required to satisfy the stoichiometric requirements of the reduction reaction, and the excess reductant is burned with a minimum amount of air to generate the heat of reaction, the gaseous effluent contains, as shown by Equation 14 above, a mole ratio of $CO_2:N_2$ of 3:4, or about 43 mole percent of carbon dioxide. As shown by Equation 2 herein, the alkaline earth metal hydrosulfide, carbon dioxide and water react to produce alkaline earth metal carbonate and two moles of hydrogen sulfide per mole of carbon dioxide consumed. Therefore, when the aforesaid gaseous stream containing carbon dioxide and nitrogen is pasesd as such (i.e., without substantial modification of the relative proportions of components), to carbonation zone 150, the gaseous product withdrawn therefrom via line 154 and passed to oxidation zone 160 via line 158 contains hydrogen sulfide and nitrogen in a mole ratio of 6:4, or about 60 mole percent of hydrogen sulfide. On the other hand, when alkaline earth metal sulfide is converted to carbonate directly by the reaction of Equation 3 herein, the hydrogen sulfide content of the effluent gas from the carbonation zone is no greater than the carbon dioxide content of the gaseous feed to the carbonation zone. Thus by effecting the conversion of alkaline earth metal sulfide to carbonate in two stages in accordance with the method of this invention in contrast to the direct conversion of the sulfide to carbonate, sulfur of the initial alkaline earth metal sulfate or sulfide is recovered as hydrogen sulfide in a more concentrated or enriched form. From the standpoint of further processing of the hydrogen sulfide product to produce sulfur dioxide or elemental sulfur, this is a particularly significant advantage of this invention. For example, it is generally recognized that, with respect to the use of sulfur dioxide containing gases for sulfuric acid manufacture, subsequent conversion of the sulfur dioxide to sulfur trioxide is facilitated by utilizing feed containing sulfur dioxide in an amount of at least 6–8 mole percent and that, the more concentrated the feed, the lower the volume of gas which must be processed and accordingly the smaller the process equipment which must be employed. With respect to the conversion of gases comprising hydrogen sulfide to elemental sulfur by the Claus Process, it is especially significant from the standpoint of favoring reactions (15) and (16) above and of facilitating subsequent separation of elemental sulfur from the water vapor by-product, to employ feed which is relatively rich in hydrogen sulfide since the higher the partial pressure of hydrogen sulfide and sulfur dioxide, the greater the yield of elemental sulfur.

Accordingly by the combination of steps illustrated by FIG. 1, a cyclic, regenerative method is provided for removal of sulfur dioxide from waste gases containing the same with recovery of the alkaline earth metal value as substantially pure, regenerated alkaline earth metal carbonate and recovery of the sulfur value as enriched hydrogen sulfide-containing gas. It is to be understood that a number of modifications may be made in the process as described with reference to FIG. 1 without departing from the scope of this invention. For example, in lieu of passing hydrogen sulfide effluent from carbonation zone 150 to oxidation zone 160, that portion passing through line 158 may be diverted to main reduction zone 120 for use therein as reductant either alone or in combination with one of the other aforementioned reductants, or it may be passed as reductant to a secondary reduction zone. In accordance with this latter modification, the solids which are fed to the secondary reduction zone may be a portion of the solids withdrawn from fire box 100 and passing through line 116, or they may be derived from the main reduction zone such as when only partial reduction of the sulfate content to sulfide has been effected therein. When recycle hydrogen sulfide is so utilized as reductant, the sulfur value of the original sulfate is also recovered as either sulfur dioxide or elemental sulfur as shown by Equations 9–11 above.

As discussed above with reference to FIG. 1, when heat is generated within the reduction zone by burning the solid carbonaceous material with air, the resulting carbon dioxide effluent and hydrogen sulfide product are diluted with nitrogen. Although the relative proportion of hydrogen sulfide to nitrogen in the gaseous effluent from the carbonation zone is substantially greater than the relative proportion of reactive carbon dioxide to nitrogen in the feed thereto, it may be desired to avoid any dilution of the hydrogen sulfide product with nitrogen. This may be accomplished by supplying heat by means other than combustion, such as electrical means or heat exchanger tubes within the reaction zone. In this manner, the use of a solid carbonaceous material as reductant only, provides a gaseous reduction zone effluent of substantially pure carbon dioxide for the carbonation reaction, and thus a substantially pure hydrogen sulfide product for conversion to either sulfur dioxide or elemental sulfur. Gaseous reduction zone effluent consisting essentially of carbon dioxide for use in the carbonation reaction is also supplied by employing carbon monoxide as the reductant.

When the combination of reduction, solubilization and carbonation reactions described with reference to FIG. 1, is applied to alkaline earth metal sulfate derived from a source which does not depend upon the use of alkaline earth metal carbonate such as native and byproduct gypsum, the alkaline earth metal carbonate which is withdrawn from separation zone 170 via line 174 may be recovered as such for some other industrial use, or it may be thermally decomposed to alkaline earth metal oxide and carbon dioxide. When it is so desired to recover the alkaline earth metal value as oxide, and when using a reductant other than one comprising carbon such as hydrogen and hydrogen sulfide, the carbon dioxide produced by thermal decomposition of the carbonate is advantageously recycled to the carbonation zone as the carbon dioxide feed thereto supplemented by additional feed to form the carbonate initially and to supply make-up carbon dioxide.

EXAMPLE 1

This example illustrates by way of a specific embodiment of the process of the present invention, the recovery of the sulfur content and calcium value of calcium sulfate in admixture with coal ash which is formed by feeding calcium carbonate to a coal-fired boiler of an electric power generator. For example, in the boiler, bituminous coal having average sulfur and ash contents of about 2.5 and about 10 weight percent, respectively, is burned with generation of flue gas containing sulfur dioxide (about 200–300 parts per million), sulfur trioxide (about 10–5 p.p.m.), nitrogen oxides, carbon dioxide, nitrogen, oxygen and steam. The hot flue gas which is at about 3600° F., cools as it rises within the boiler and calcium carbonate is injected therein when the gas is at a temperature of between about 2500° F. and about 2000° F., for example, 2200° F. At the latter temperatures, carbonate reacts with sulfur dioxide in the flue gas in the presence of oxygen to form calcium sulfate according to the following equation:

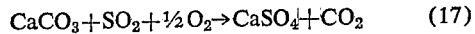
$$CaCO_3 + SO_2 + \tfrac{1}{2}O_2 \rightarrow CaSO_4 + CO_2 \qquad (17)$$

In view of the indicated elevated temperature, the calcium carbonate may first thermally decompose to calcium oxide and carbon dioxide, but regardless of the actual form of the calcium carbonate, the residence time being only a few seconds, the overall reaction is as expressed by Equation 17. Since the flue gas rises within the boiler at a high velocity, the coal ash is carried along in the flue gas and becomes admixed with the calcium sulfate as the latter is formed. The residual gas having the calcium sulfate-ash solids suspended therein, is then passed through solids removal equipment such as cyclones to separate the solids, and the flue gas which is now substantially free of sulfur dioxide pollutant, is discharged to the atmosphere. Instead of current practice of simply discharging the solids to waste disposal equipment, the solids are treated by the process of this invention as typically illustrated by FIG. 2. In this example, the composition of the various gaseous overhead streams withdrawn from the indicated zones and passing through the indicated reference lines are tabulated in Table I below.

The calcium sulfate-ash mixture formed and recovered as above is passed into sulfate feed bin 200 by means of line 202 at an hourly flow rate of 74,400 pounds (547 pound-moles) of calcium sulfate and 70,100 pounds per hour of coal ash, and is withdrawn therefrom via line 204 and passed into line 206. The calcium sulfate-ash mixture is conveyed through line 206 to sulfate lock hoppers 208 by means of waste flue gas derived from a subsequent stage of the process and flowing into line 206 from line 308. Bituminous coal having a moisture content of about 1.3 weight percent is fed to coal feed bin 218 via line 216 at a rate of 24,480 pounds per hour, the coal having the following chemical composition, expressed on a dry and weight percent basis: 70.0 carbon, 5.0 hydrogen, 1.5 nitrogen, 11.0 oxygen, 2.5 sulfur and 10.0 ash. The coal is withdrawn from bin 218 by means of line 222 and is conveyed through line 224 into coal lock hoppers 228 by means of waste flue gas passing through line 309. The flue gas used as the conveying medium is vented from hoppers 208 and 228 via line 225.

The calcium sulfate-ash mixture and coal are passed at the aforesaid flow rates from lock hoppers 208 and 228 via lines 232 and 234, respectively, to reduction zone 240. Air, preheated to 1500° F. and at a pressure of 44 p.s.i.a., is fed to the lower portion of reduction zone 240 by means of line 236 at a flow rate of 3441 pound-moles per hour. The air for use in the reduction zone contains 79.0 mole percent nitrogen and 21.0 mole percent oxygen, expressed on a dry basis, and is introduced to the system at 77° F. and 15 p.s.i.a. by means of line 212. The air is compressed to 48 p.s.i.a. in compressor 214 and is then passed via lines 215 and 219 through heat exchangers 220 and 217, respectively, wherein it is heated by indirect heat exchange against hot gaseous effluent withdrawn from reduction zone 240 and passing through lines 244 and 246. In accordance with this example, as the air exits from heat exchanger 220 it is at a temperature of 900° F. and a pressure of 46 p.s.i.a. and, as it exits from heat exchanger 217 and flows through line 236 into reduction zone 240, it is at the preheat temperature of 1500° F. and pressure of 44 p.s.i.a.

Reduction zone 240 comprises a fluid bed reactor within which a portion of the coal fed thereto by means of line 234 is burned to bring the solids to and maintain a reaction temperature of 1700° F. The solids are maintained in a fluidized condition as the nitrogen of the air feed and residual oxygen pass upwardly through the calcium sulfate-ash-coal mixture. The coal which is not consumed for the generation of heat is utilized as the reductant to convert calcium sulfate to calcium sulfide with formation of carbon dioxide according to the following equation:

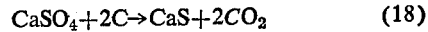
$$CaSO_4 + 2C \rightarrow CaS + 2CO_2 \qquad (18)$$

The carbon dioxide also functions as fluidizing medium as it is generated and passes upwardly through the solids within the reduction zone.

A gaseous effluent stream containing nitrogen, carbon dioxide product, residual oxygen and water vapor in the relative proportions indicated in Table I, is withdrawn from the upper portion of reduction zone 240 by means of line 244 at an hourly flow rate of 4883 pound-moles, entrainment of fluidized solids therein being prevented by means of cyclone 241 having dipleg 242. The gaseous effluent stream, which is at a temperature of 1700° F. and a pressure of 35 p.s.i.a., is then passed via lines 244 and 246 through heat exchangers 217 and 220, respectively, wherein it is cooled by indirect heat exchange against incoming air passing through lines 215 and 219 as described above. In accordance with this example, as the gaseous reduction zone effluent exits from heat exchanger 217, it is at a temperature of 1368° F. and pressure of 33 p.s.i.a., and as it exits from heat exchanger 220 into line 248 it is at a temperature of 1032° F. and pressure of 31 p.s.i.a. The gaseous effluent is then passed by means of lines 248 and 252 through heat exchangers 297 and 298, respectively, wherein it is further cooled to 600° F. and 403° F., respectively, by indirect heat exchange against boiler feed water which is introduced to the system via line 292 having pump 293 therein at a flow rate of 53,200 pounds per hour. A portion of the water (23,000 pounds per hour) which is at a temperature of 60° F. and under a pressure of 140 p.s.i.a. is diverted through line 294 into heat exchanger 298 wherein it is brought to 353° F. and is then conveyed via line 295 through heat exchanger 297 wherein it absorbs heat from the gaseous reduction zone effluent and is vaporized. The steam which is generated in heat exchanger 297 is withdrawn therefrom at 353° F. and pressure of 140 p.s.i.a. by means of line 296 at a flow rate of 23,000 pounds per hour.

The gaseous effluent containing carbon dioxide from reduction zone 240 is at a temperature of 403° F. and pressure of 29 p.s.i.a. as it passes from heat exchanger 298 into line 253, and is split into two streams. One stream (1811 pound-moles per hour) is passed as feed to carbonation zone 360 via line 254 and the other stream (3072 pound-moles per hour) is diverted into line 256 and utilized in further handling and cooling of the hot fluidized solids which are withdrawn from reduction zone 240 by means of standpipe 264. The fluidized effluent which contains the calcium sulfide product of reduction, unreacted calcium sulfate and ash derived from both the original charge of calcium sulfate fed to the reduction zone and the coal consumed within the reduction zone, is passed from standpipe 264 into line 266 at an hourly flow rate of 37,400 pounds of calcium sulfide (about 520 pound-moles), 3670 pounds of unconverted calcium sulfate and 72,550 pounds of ash. The aforesaid fluidized effluent is at a temperature of 1700° F. and is conveyed through line 266 to a cooling zone 280 by means of a portion of the gaseous reduction zone effluent which is diverted from line 256 via line 257 into line 266 at an hourly flow rate of 28 pounds-moles. The remaining gaseous reduction zone effluent flowing through line 256 is passed into line 258 and a portion thereof is passed into the lower section of cooling zone 280 via line 259 at a flow rate of 3000 pound-moles per hour.

Within cooling zone 280 which is provided with internal tube bundle 284, the hot calcium sulfide-calcium sulfate-ash mixture is fluidized by the gaseous stream fed to the lower portion thereof by means of line 259 and is cooled from 1700° F. to 450° F. as the mixture passes in indirect heat exchange against boiler feeder water introduced via line 286 by means of pump 287 to tube bundle 284 at a temperature of 353° F. and under a pressure of 140 p.s.i.a. The heat released by the solids as they are cooled causes vaporization of the boiler feed water which is withdrawn from tube bundle 284 as steam (353° F., 140 p.s.i.a.) and passed to collecting zone 289 via line 288 at a rate of 40,600 pounds per hour. Steam is withdrawn from collecting zone 289 by means of line 290 at a rate of 30,200 pounds per hour and is combined in line 299 with the steam (353° F., 140 p.s.i.a.) generated, as described above, in the cooling of the gaseous reduction zone effluent in heat exchanger 297 and flowing through line 296 at a rate of 23,000 pounds per hour for a total steam recovery of 53,200 pounds per hour. A portion of the boiler feed water which is fed to the system by means of line 292 and passed through line 294 (60° F., 140 p.s.i.a.) is diverted at a rate of 30,200 pounds per hour through line 291 into collecting zone 289 wherein it is heated to 353° F. by condensation of that portion of the steam which is not sent to steam recovery and is then circulated to tube bundle 284 via line 286 by means of pump 287.

The calcium sulfide-calcium sulfate-ash mixture is withdrawn from cooling zone 280 at 450° F. by means of standpipe 285 and is passed to quenching zone 320 via line 312 through which the solids are conveyed by means of the remaining portion of the cooled (403° F.) gaseous reduction zone effluent diverted from line 258 into line 260 at a flow rate of 44 pound-moles per hour. The gaseous fluidizing medium which flows upwardly through the solids within cooling zone 280 passes through cyclone 281 having dipleg 282 to prevent entrainment of solids, and is withdrawn therefrom at 450° F. and a pressure of 23 p.s.i.a. by means of line 300 at a total flow rate of 3028 pound-moles per hour. A portion of the gaseous effluent stream is passed into line 306 at a flow rate of 315 pound-moles per hour and is used, as described above, to convey the coal and calcium sulfate-ash feeds to their repsective lock hoppers 228 and 208. A second portion of the gaseous effluent stream from zone 280 is passed to quenching zone 320 via line 302 at a rate of 277 pound-moles per hour, and the remaining portion is passed through line 317 having pressure release valve 315 thereon and is sent to stack as waste gas at a flow rate of 2436 pound-moles per hour.

The calcium sulfide-calcium sulfate-ash mixture is fed to quenching zone 320 by means of line 312 at an hourly flow rate of 37,400 pounds (about 520 pound-moles) of calcium sulfide, 3670 pounds of calcium sulfate and 72,550 pounds of ash. Within quenching zone 320, the mixture of solids is further cooled from 450° F. to 152° F. by quenching with make-up water introduced at 60° F. by means of line 314 at a flow rate of 67,030 pounds per hour. The aforementioned gaseous stream which is introduced to the quenching zone via line 302 is passed through sparge 322 and is used to remove vaporized water. In order to provide a uniform slurry, quenching zone 320 is provided with any suitable means of agitation such as stirring means. Gaseous overhead at a temperature of 182° F. and pressure of 15 p.s.i.a. and having the composition indicated in Table I below, is withdrawn from quenching zone 320 at an hourly rate of 434 pound-moles via line 318 and is combined in line 319 with the gaseous stream flowing through line 317, the combined stream being sent to stack as waste flue gas at a total flow rate of 2870 pound-moles per hour.

The aqueous slurry of calcium sulfide, calcium sulfate and ash which is formed in quenching zone 320 is withdrawn therefrom via line 326 and is combined in line 328 with additional water (157,070 pounds per hour) from line 391. The aqueous slurry is then passed to solubilization zone 330 via line 328 at an hourly flow rate of 221,790 pounds of water and 113,620 pounds of total solids of which about 520 pound-moles is calcium sulfide, 3670 pounds is calcium sulfate and 72,550 pounds is ash. Also introduced to solubilization zone 330 via line 362 at a rate of 1223 pound-moles per hour is a gaseous stream comprising hydrogen sulfide having the composition shown in Table I and being derived from carbonation zone 360 as described below, the flow rate of hydrogen sulfide to zone 330 being about 520 pound-moles per hour. Within solubilization zone 330 which comprises a stirred reactor, the aqueous slurry is at a temperature of 150° F. and, as the hydrogen sulfide containing gas flowing through line 362 is passed into the slurry, the hydrogen sulfide is consumed by reacting the aqueous medium with the calcium sulfide to form water soluble calcium hydrosulfide according to the following equation, and the calcium sulfate and ash remain in the solid, undissolved state:

$$CaS + H_2S \xrightarrow{(H_2O)} Ca(SH)_2 \qquad (19)$$

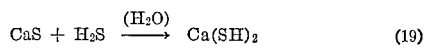

The residual gaseous stream containing nitrogen, oxygen and water vapor is vented from zone 330 by means of line 364.

The aqueous solution of calcium hydrosulfide having unreacted calcium sulfate and ash contaminants suspended therein, is withdrawn from solubilization zone 330 by means of line 365 at an hourly flow rate of: 275,500 pounds of aqueous solution of which 55,100 pounds or about 520 pound-moles is dissolved calcium hydrosulfide; and 76,220 pounds of suspended solids. The slurry is passed into liquid-solids separation zone 340 which, as shown, comprises rotary filtration drum 341. In separation zone 340, the calcium sulfate-ash mixture is separated from the aqueous solution of calcium hydrosulfide and the solids are discharged therefrom via line 342. The separated solids are then conveyed to disposal by means of solids conveyor 344 at a flow rate of 72,550 pounds per hour of ash and 3,670 pounds per hour of unconverted calcium sulfate which flow rates correspond to those of the calcium sulfate and ash contaminants contained in the calcium sulfide effluent withdrawn from reduction zone 240 via standpipe 264.

The filtrate or aqueous solution of the calcium hydrosulfide which is now free of solids, is withdrawn from separation zone 340 by means of line 367 having pump 366 thereon and is passed through cooler 368 to lower the temperature of the solution from 150° F. to 120° F. The solution is then passed via line 369 to the upper portion of carbonation one 360 and is introduced to one 360 at an hourly flow rate of 55,100 pounds (about 520 pound-moles) of solubilized calcium hydrosulfide and 220,400 pounds of water. Within carbonation zone 360, the aqueous solution of calcium hydrosulfide is passed downwardly in countercurrent flow with that portion of the total gaseous carbon dioxide-containing effluent evolved from reduction zone 240 which is diverted from line 253 into line 254.

The gaseous stream comprising carbon dioxide and flowing through line 254 is at a temperature of 403° F. and a pressure of 29 p.s.i.a., and is introduced to the lower portion of carbonation zone 360 at a total flow rate of 1811 pound-moles per hour, the composition thereof being as given in Table I. The carbon dioxide contained in the incoming gaseous feed constitutes about 29.2 mole percent of the total stream and is passed to zone 360 at an hourly flow rate of about 529 pound-moles. As the aqueous solution of calcium hydrosulfide is brought into countercurrent contact with the upwardly flowing carbon dioxide containing gaseous feed, calcium carbonate is formed and, for every mole of carbon dioxide consumed, two moles of hydrogen sulfide are generated in accordance with the reaction of the following equation:

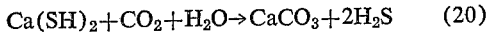

$$Ca(SH)_2 + CO_2 + H_2O \rightarrow CaCO_3 + 2H_2S \quad (20)$$

As the gaseous stream (403° F.) passes upwardly through the aqueous solution which when fed to carbonation zone 360 is at a temperature of 120° F., the hydrogen sulfide is stripped from the aqueous medium and is withdrawn in the overhead effluent from zone 360 at a temperature of 145° F. and pressure of 24 p.s.i.a. by means of line 361. The gaseous effluent having the composition shown in Table I passes into line 361 at a total flow rate of 2446 pound-moles per hour of which about 42.5 mole percent is hydrogen sulfide having an individual flow rate of about 1040 pound-moles per hour. About one-half of the gaseous effluent withdrawn from carbonation zone 360 is passed from line 361 via line 362 to solubilization zone 330 wherein, as described above, the hydrogen sulfied content (about 520 pound-moles per hour) is utilized to convert calcium sulfide to water soluble calcium hydrosulfide. The remaining 50 percent portion of the gaseous effluent from carbonation zone 360 and having the composition shown in Table I, is diverted into line 363 and passed to oxidation zone 380 at a total flow rate of 1223 pound-moles per hour of which about 520 pound-moles per hour or 42.5 mole percent is hydrogen sulfide. Prior to being passed to oxidation zone 380, the concentration of hydrogen sulfide may be further increased to about 49 mole percent by passing the gaseous stream in line 363 through a condensation zone (not shown) to condense and separate the water vapor contained therein. Within oxidation zone 380, the hydrogen sulfide is converted to elemental sulfur by the above-discussed Claus Process which depends upon Equations 15 and 16 herein, elemental sulfur being withdrawn from oxidation zone 380 at an hourly flow rate of 15,000 pounds (468 pound-moles) by means of line 381.

The aqueous slurry of calcium carbonate produced in carbonation zone 360 is withdrawn therefrom at a temperature of 178° F. by means of line 393 at an hourly flow rate of 52,000 pounds (520 pound-moles) of calcium carbonate and 209,070 pounds of water. The slurry is then introduced to concentration zone 390 wherein water is separated and removed therefrom at 158° F. by means of line 391 at a rate of 157,070 pounds per hour. The separated water is then passed through overflow pump 392 on line 391 and into line 328 where it is combined with the aqueous slurry of calcium sulfide-calcium sulfate-ash mixture from line 326 and passing to solubilization zone 330 as described above. The separation of water in zone 390 increases the concentration of the slurry to 50 weight percent calcium carbonate. The concentrated slurry is withdrawn from zone 390 via line 394 at an hourly flow rate of 52,000 pounds of each of calcium carbonate and water, and is combined in line 396 with a make-up 50 weight percent slurry of calcium carbonate conveyed at a rate of 5400 pounds per hour through line 371 by means of pump 372. The make-up calcium carbonate is fed to the system at a rate of 2700 pounds per hour to carbonate storage bin 378 via line 379, is passed through line 377 to carbonate feed hopper 376 and then through line 375 into stirred slurry tank 374 to which water is also fed at a rate of 2700 pounds per hour by means of line 373. The combined slurry in line 396 having pump 397 thereon is then conveyed to the coal-fired boiler for use therein as described above to remove sulfur dioxide from the flue gas generated therein. The hourly flow rate of slurry passing through line 396 to the boiler is 54,700 pounds per hour of each of calcium carbonate (547 pound-moles) and water. As noted above, the composition of the various gaseous feeds and gaseous effluents described with reference to FIG. 2 is given in Table I which now follows.

TABLE I

| | Reference line | Composition, mole percent | | | | |
|---|---|---|---|---|---|---|
| | | $N_2$ | $O_2$ | $CO_2$ | $H_2O$ | $H_2S$ |
| Gaseous effluent from reduction zone 240 | 244; 253 | 56.4 | 1.9 | 29.2 | 12.5 | |
| Gaseous effluent from cooling zone 280 | 300 | 56.4 | 1.9 | 29.2 | 12.5 | |
| Gaseous effluent from quenching zone 320 | 318 | 41.7 | 1.4 | 21.6 | 35.3 | |
| Gaseous feed to carbonation zone 360 | 254 | 56.4 | 1.9 | 29.2 | 12.5 | |
| Gaseous effluent from carbonation zone 360 | 361 | 41.7 | 1.4 | 0.4 | 14.0 | 42.5 |
| Gaseous feed to solubilization zone 330 | 362 | 41.7 | 1.4 | 0.4 | 14.0 | 42.5 |
| Gaseous feed to oxidation zone 380 | 363 | 41.7 | 1.4 | 0.4 | 14.0 | 42.5 |
| Off-Gas to stack | {319 / {225 | 54.1 / 56.4 | 1.8 / 1.9 | 28.1 / 29.2 | 16.0 / 12.5 | |

EXAMPLE 2

The starting material employed in this example was a mixture containing calcium sulfate (13.6 grams; 0.1 mole), anthracite coal (4 grams) and added coal ash (4 grams). The anthracite coal employed as reductant had the following composition on a weight basis: 78.60 percent fixed carbon, 4.68 percent water, 11.14 percent ash and 5.58 percent volatile matter including hydrocarbon. X-ray diffraction analysis of a sample of the added coal ash showed the presence of the alpha quartz form of silica as the major crystalline component and calcium sulfate. The mixture was heated in a quartz reactor under a slow stream of nitrogen within the temperature range 893° C. to 921° C. (1639° F. to 1689° F. for a period of about 1 hour and 55 minutes, to reduce calcium sulfate to calcium sulfide, after which the reaction product was cooled to room temperature in nitrogen. During the course of the reduction reaction, carbon dioxide was evolved and collected in an aqueous solution of sodium hydroxide (1.027 normal), the amount of carbon dioxide being determined by titration of the solution using phenolphthalein as indicator. As a result of this determination, it was found that a total of 169.4 millimoles of carbon dioxide had been evolved. The solid product of reduction weighed 11.9 grams and, upon X-ray diffraction analysis, was found to contain calcium sulfide, and the alpha quartz form of silica as a minor crystalline component. Of the total solid reaction product, 10.9 grams were charged to a stirred flask to which 500 ml. of water was also added. Hydrogen sulfide was then fed into the slurry to form water soluble calcium hydrosulfide. The slurry was agitated at about 90° F. and hydrogen sulfide was fed thereto until the pressure held at atmospheric pressure for 60–90 minutes. The reactor was then vented and the aqueous reaction medium was filtered to separate water insoluble material which upon washing and drying, weighed 5.5 grams. Upon X-ray diffraction analysis of a sample of the water insoluble residue, it was found to contain the alpha quartz form of silica as the major crystalline component, and the presence of neither crystalline calcium sulfate nor crystalline calcium sulfide was detected. The clear filtrate was then heated with stirring in a reactor to 65° C. (149° F.) and gaseous feed containing about 43 percent carbon dioxide and about 57 volume percent nitrogen was introduced to the stirred solution to convert calcium hydrosulfide to calcium carbonate precipitate and hydrogen sulfide. The evolution of hydrogen sulfide was followed by gas chromotographic analysis, and the gaseous carbon dioxide feed was passed through the aqueous medium until no more hydrogen sulfide was detected in the effluent. After raising the temperature of the aqueous slurry to the boiling point, the slurry was then cooled and filtered. The precipitate was washed with water and dried, the dried product weighing 7.65 grams. Wet chemical analysis of the precipitated product indicated that it contained 96.54 percent $CaO \cdot CO_2$ and 0.13 percent sulfur as sulfide, the presence of this small amount of sulfide being attributable to physically absorbed hydrogen sulfide which was not completely removed during washing of the precipitate with water. Upon further analysis of the product by X-ray diffraction, the crystalline materials present therein were identified as the calcite and aragonite forms of calcium carbonate, and the presence of neither crystalline calcium sulfide nor crystalline calcium sulfate was detected.

EXAMPLE 3

The procedure and reactions of this example, were essentially the same as those described under Example 2 above, except that coal ash was not added to the initial mixture. Thus, a mixture of calcium sulfate (13.6 grams; 0.1 mole) and anthracite coal (4 grams) having the composition given above under Example 2 was heated in a quartz reactor under a slow stream of nitrogen, the temperature being raised slowly to 825° C. (1517° F.). The reduction was continued while raising the temperature to 866° C. and maintaining the temperature at 869–880° C. for 24 minutes after which the temperature was raised to and held at 900° C. for an additional 21 minutes and then at 909–935° C. for 32 minutes after which the reaction product was cooled in nitrogen. During the course of the reduction, carbon dioxide was evolved and collected in an aqueous solution of sodium hydroxide (1.00 normal) and, following the procedure described under Example 2 above, it was found that a total of 165 millimoles of carbon dioxide had been collected. Upon X-ray diffraction analysis of a sample of the reduced product, calcium sulfide was identified as the crystalline component. An aliquot portion (6.4 grams) or the reduced product as slurried in water and hydrogen sulfide was introduced thereto to convert calcium sulfide to water soluble calcium hydrosulfide. The aqueous solution was then filtered to separate water insoluble residue which upon washing with water and drying had a weight of 1.5 grams. The clarified filtrate was then treated with carbon dioxide to form calcium carbonate, the total weight of the precipitated product being 6.6 grams.

EXAMPLE 4

The starting material employed in this example was a mixture having a total weight of 61.4 grams of which about 51.7 grams (0.39 mole) was substantially pure calcium sulfate (drierite) and 9.7 grams was anthracite coal having the composition given under Example 2 above. An Inconel reactor (1″ inner diameter) was heated at 1700° F. and the aforesaid mixture was added thereto in aliquot portions over a period of about one hour and 40 minutes, the reduction being carried out under a stream of nitrogen. At the end of the reaction it was found that the solid reaction product had a total weight of 27.2 grams. A portion of the solid product (26.2 grams) and 500 ml. of water were introduced to a Parr bomb which was pressured with hydrogen sulfide to 10 p.s.i.g. The aqueous slurry was then agitated at 90° F. and additional hydrogen sulfide was added until the pressure held at 10 p.s.i.g. for 15 minutes. The bomb was then vented and the aqueous reaction medium was found to have gained about 14 grams in weight due to absorption of hydrogen sulfide. Of the 14 grams of absorbed hydrogen sulfide, about 2 grams is a fixed quantity absorbed simply by dissolution of the hydrogen sulfide in water under the aforesaid conditions. The aqueous reaction medium was filtered to separate insoluble material which, after washing with water and drying, weighed 4.4 grams. Upon X-ray diffraction analysis, the water insoluble residue was found to contain unreacted calcium sulfate as the major crystalline component, and a minor component identified as the alpha quartz form of silica, silica being present in the coal reductant. The clear filtrate and wash water were charged to a one liter flask and boiled while introducing gaseous carbon dioxide and nitrogen thereto for one hour and 40 minutes to precipitate calcium carbonate and form hydrogen sulfide. The outlet gas was sampled every 4 minutes and was subjected to gas chromotographic analysis to determine the hydrogen sulfide content in the gas evolved, the sampling of gaseous product being continued until no further hydrogen sulfide was produced. During the course of this treatment, precipitate formed and a total of 18.57 liters of hydrogen sulfide was evolved. The aqueous slurry was then cooled and filtered to separate the precipitate which was washed and dried. The dried product weighed 31.1 grams and, upon X-ray diffraction analysis, was found to contain calcium carbonate in both the calcite and aragonite crystalline forms.

EXAMPLE 5

In this example, the sulfur-bearing reactant was gypsum, and the reductant was bituminous coal containing 1.31 weight percent water and having the following composition, expressed on a dry and weight percent basis: 83.6% total carbon, 5.14% hydrogen, 1.48% nitrogen, 0.66% sulfur, 5.27% oxygen and 3.85% ash. A mixture (69.6 grams) of the gypsum (58.7 grams) and coal (10.9 grams) was heated in a reactor under a stream of nitrogen at about 1700° F. over a period of approximately 2 hours, the mixture being charged to the reactor in aliquot portions. The solid product of reaction weighed 27.7 grams and 27.5 grams thereof were slurried in 500 ml. of water and treated with hydrogen sulfide as described under Example 4 above. The water insoluble material remaining after this treatment was separated by filtration, washed and dried, the dried material weighing 8.68 grams. The clear filtrate and wash were fed to a one liter reactor heated to boiling, and gaseous feed containing carbon dioxide and nitrogen, was introduced to the clear solution. During the course of the reaction, precipitate formed and the effluent gas was analyzed for hydrogen sulfide content by gas chromotography. After 54 minutes, it was found that 14.52 liters of hydrogen sulfide had been evolved. The precipitate was collected by filtration, washed and dried. The recovered precipitate weighed 25.8 grams and, upon X-ray diffraction analysis thereof, the crystalline material was identified as the calcite form of calcium carbonate.

EXAMPLE 6

To a quartz reactor there was added a mixture of barium sulfate (21.6 grams) and anthracite coal (3.7 grams) having the composition given under Example 2 above. The reactor was placed in a pre-heated furnace and the reduction of barium sulfate by the coal was carried out under a slow stream of nitrogen under the conditions given in Table II below. Gaseous carbon dioxide produced during the course of the reduction reaction was collected and the amount evolved was determined by titration, the results of the titration also being given in Table II.

TABLE II

| Time into run (minutes) | Temperature (° C.) | Carbon dioxide produced (millimoles) |
| --- | --- | --- |
| 2 | 881 | 10 |
| 4 | 889 | 20 |
| 6 | 879 | 30 |
| 8 | 857 | 40 |
| 11 | 869 | 50 |
| 13 | 881 | 60 |
| 16 | 887 | 70 |
| 18 | 889 | 80 |
| 22 | 894 | 90 |
| 25 | 898 | 100 |
| 30 | 907 | 120 |
| 33 | 910 | 130 |

The reaction mixture was heated for an additional one hour period at 900° C. during which time an additional 7.1 millimoles of carbon dioxide were evolved as determined by titration. The solid residue weighed 16.13 grams and upon X-ray diffraction analysis of a sample thereof, barium sulfide was identified as the crystalline component. The total weight of the solid product of the reduction was 16.13 grams and a portion thereof (14.1 grams) was added to 500 ml. of water, and hydrogen sulfide (5 grams) was passed into the aqueous slurry to form barium hydrosulfide. The resulting solution in which some solids remained undissolved was filtered to remove the insoluble material which, after washing and drying, weighed 1.8 grams. The filtrate and wash water were combined, heated to boiling and gaseous feed containing carbon dioxide and nitrogen was fed thereto. The resulting precipitate was separated by filtration, washed and dried. The dried product weighed 13.9 grams and the crystalline material was identified as barium carbonate by X-ray diffraction analysis.

EXAMPLE 7

In accordance with this example, gypsum was reduced with hydrogen in a quartz reactor positioned within a furnace and provided with a preheat zone within the reducing gas was brought to preheat temperature and a reaction zone comprising a fritted crucible within which the gypsum was placed, the crucible being provided with a thermocouple for direct measurement of the temperature at which the reduction was carried out. During the course of the reduction, the change in volume of the hydrogen was measured by means of a nitrometer, and the reducing gas was circulated in a closed loop, with passage of the gas through a water scrubber to maintain the water vapor pressure of the gas substantially constant. In the start-up procedure, the reactor was flushed with nitrogen and the nitrogen was then replaced with hydrogen after which the reducing gas was continuously circulated through the water scrubber, preheat zone, the fritted crucible in contact with the gypsum, into the outlet line and back to the water scrubber. Following this procedure gypsum (0.1006 gram) containing 94.7 weight percent calcium sulfate and silica as the major impurity, was contacted with hydrogen gas containing approximately 3 percent by volume of water vapor, calculated on the basis of the water vapor pressure at about 75° F. The reaction temperature was maintained at 1700° F. to 1705° F. for a period of eight minutes during which time it was observed that 53.5 cc. of hydrogen were absorbed. The reduced product weighed 0.0545 gram and, upon X-ray diffraction analysis thereof, the presence of calcium sulfide as the main crystalline component was identified and the alpha quartz form of silica was identified as a minor component. It is evident from the present teachings that the solid product comprising calcium sulfide in association with impurities derived by reducing gypsum with hydrogen or other reducing gases such as carbon monoxide may also be converted to calcium carbonate with prior removal of impurities, by subjecting such a product to the solubilization and by carbonation reactions described herein and as typically illustrated by the above specific examples.

Various modifications and alterations of the process of this invention may become apparent to those skilled in the art from the teachings of this invention without departing from the scope thereof.

What is claimed is:
1. A cyclic, regenerative process for the removal of sulfur dioxide from waste gases containing the same which comprises:
   (a) injecting at least one member of the group consisting of an alkaline earth metal carbonate and an alkaline earth metal oxide into an initial reaction zone and in contact with a gas comprising sulfur dioxide and oxygen and having solid impurities suspended therein, said gas being at a temperature between about 1000° F. and about 2500° F., to produce as the reaction product solids comprising alkaline earth metal sulfate in association with said solid impurities,
   (b) withdrawing said solids from said initial reaction zone and introducing said solids to a reduction zone, in said reduction zone contacting said solids with a reductant under conditions including a temperature between about 1200° F. and about 2000° F. such that alkaline earth metal sulfate is reduced to alkaline earth metal sulfide,
   (c) withdrawing from said reduction zone solids comprising alkaline earth metal sulfide in association with impurities derived from said gas comprising sulfur dioxide, combining said solid withdrawn from said reduction zone with water to form an aqueous slurry thereof, contacting the resultant slurry in a solubilization reaction zone with hydrogen sulfide to solubilize alkaline earth metal sulfide as alkaline earth metal hydrosulfide, the resulting aqueous solution of alkaline earth metal hydrosulfide having water insoluble impurities suspended therein,
   (d) passing said aqueous solution having said impurities suspended therein to a liquid-solids separation zone, in said separation zone separating said water insoluble impurities from said aqueous solution,
   (e) passing the clarified aqueous solution of alkaline earth metal hydrosulfide to a carbonation reaction zone, in said carbonation reaction zone contacting said solution with carbon dioxide thereby precipitating alkaline earth metal carbonate and producing hydrogen sulfide,

(f) withdrawing gaseous effluent comprising hydrogen sulfide from said carbonation reaction zone and passing a portion thereof to said solubilization reaction zone as the hydrogen sulfide feed thereto, and (g) recovering alkaline earth metal carbonate substantially free of said impurities from said carbonation zone and passing at least one member of the group consisting of said recovered alkaline earth metal carbonate and alkaline earth metal oxide derived from said recovered carbonate, to said initial reaction zone for reutilization therein.

2. The process of claim 1 in which said alkaline earth metal is calcium.

3. The process of claim 1 in which said alkaline earth metal is barium.

4. The process of claim 1 in which said alkaline earth metal is strontium.

5. The process of claim 1 in which said aqueous solution of alkaline earth metal hydrosulfide and carbon dioxide are passed in countercurrent contact in said carbonation reaction zone.

6. The process of claim 1 in which at least a portion of the remaining gaseous effluent containing hydrogen sulfide withdrawn from said carbonation reaction zone is passed to a reaction zone wherein a portion of the hydrogen sulfide fed thereto is oxidized to sulfur dioxide and the remaining hydrogen sulfide and sulfur dioxide are contacted under conditions such that elemental sulfur is produced and in which elemental sulfur is recovered as a product of the process.

7. The process of claim 1 in which at least a portion of the remaining gaseous effluent containing hydrogen sulfide withdrawn from said carbonation reaction zone is passed to an oxidation zone wherein hydrogen sulfide is contacted with an oxygen-containing gas under conditions such that sulfur dioxide is produced and in which sulfur dioxide is recovered as a product of the process.

8. The process of claim 1 in which an oxygen-containing gas is introduced to said reduction zone and a portion of the reductant is burned therewith with generation of heat.

9. The process of claim 1 in which steam is present in said reduction zone.

10. The process of claim 1 in which said reductant comprises carbon and the reduction of alkaline earth metal sulfate to alkaline earth metal sulfide is accompanied by the formation of carbon dioxide and in which gaseous effluent comprising carbon dioxide is withdrawn from said reduction zone and at least a portion thereof is passed to said carbonation zone as the carbon dioxide feed thereto.

11. The process of claim 1 in which said reductant comprises a solid carbonaceous material.

12. The process of claim 11 in which said solid carbonaceous material is coal.

13. The process of claim 1 in which said reductant comprises a hydrocarbon.

14. The process of claim 1 in which said reductant comprises a normally gaseous reductant.

15. The process of claim 14 in which said normally gaseous reductant is natural gas.

16. The process of claim 14 in which said normally gaseous reductant comprises hydrogen.

17. The process of claim 14 in which said normally gaseous reductant comprises carbon monoxide.

18. The process of claim 14 in which said normally gaseous reductant comprises hydrogen sulfide.

19. The process of claim 1 in which at least a portion of the remaining gaseous effluent comprising hydrogen sulfide withdrawn from said carbonation zone is passed to said reduction zone.

20. A cyclic, regenerative process for the removal of sulfur dioxide from waste gases containing the same which comprises in combination:

(a) injecting calcium carbonate into an initial reaction zone and in contact with a gas comprising oxygen and sulfur dioxide and having solid contaminants entrained therein to form solids comprising calcium sulfate in admixture with said solid contaminants;

(b) passing said solids, a reductant comprising carbon and an oxygen-containing gas to a reduction zone, in said reduction zone burning a portion of the reductant with said oxygen-containing gas to generate heat and contacting said solids with reductant at an elevated temperature between about 1200° S. and about 2000° F. such that sulfate is reduced to sulfide and carbon dioxide is formed;

(c) withdrawing from said reduction zone gaseous effluent comprising carbon dioxide and solids comprising calcium sulfide in association with solid contaminants derived from said solids comprising calcium sulfate, slurrying said solids withdrawn from said reduction zone in water and contacting the resultant aqueous slurry in a solubilization reaction zone with a gas containing hydrogen sulfide to form an aqueous solution of calcium hydrosulfide having water insoluble contaminants suspended therein;

(d) separating said water insoluble contaminants from said solution, and passing the clarified aqueous solution of calcium hydrosulfide to a carbonation zone;

(e) passing at least a portion of the gaseous effluent comprising carbon dioxide withdrawn from the reduction zone to said carbonation zone, in said carbonation zone passing the carbon dioxide-containing gaseous feed thereto into contact with said aqueous solution of calcium hydrosulfide to form calcium carbonate and hydrogen sulfide;

(f) withdrawing gaseous effluent containing hydrogen sulfide from said carbonation zone and passing at least a portion thereof to said solubilization zone; and (g) withdrawing an aqueous slurry of calcium carbonate from said carbonation zone and passing calcium carbonate to said initial reaction zone for reutilization therein.

21. The process of claim 20 in which a portion of the hydrogen sulfide produced in said carbonation zone is passed to said reduction zone.

22. The process of claim 20 in which said reductant comprising carbon is coal.

23. The process of claim 20 in which said reductant comprising carbon is carbon monoxide.

24. The process of claim 20 in which said reductant comprising carbon is in combination with a reducing gas comprising hydrogen.

References Cited

UNITED STATES PATENTS

| | | | |
|---|---|---|---|
| 616,391 | 12/1898 | Baranoff et al. | 23—134 |
| 1,067,595 | 7/1913 | Ekstrom | 23—66 |
| 1,457,436 | 6/1923 | Howard et al. | 23—137 |
| 1,580,452 | 4/1926 | Sperr | 23—3 |
| 1,634,338 | 7/1927 | Pierce | 23—66 |
| 1,636,106 | 7/1927 | Naef | 23—137 |
| 2,346,577 | 4/1944 | Hartman | 23—134 |
| 2,374,632 | 4/1945 | Walker | 23—66 |
| 2,384,926 | 9/1945 | Jones | 23—235 |
| 2,718,453 | 9/1955 | Beckman | 23—2 |
| 3,320,906 | 5/1967 | Domahidy | 23—2X |

FOREIGN PATENTS

| | | | |
|---|---|---|---|
| 365,090 | 1/1932 | Great Britain | 23—178 |

EARL C. THOMAS, Primary Examiner

U.S. Cl. X.R.

23—66, 122, 134, 137, 178, 181